US006669086B2

(12) United States Patent
Abdi et al.

(10) Patent No.: US 6,669,086 B2
(45) Date of Patent: Dec. 30, 2003

(54) SELF SERVICE CHECK CASHING SYSTEM AND METHOD

(76) Inventors: Faisal H. Abdi, 9801 Alwaes Dr., #201, Fairfax, VA (US) 22031; Hawa S. Hassan, 9801 Alwaes Dr., #201, Fairfax, VA (US) 22031; Mustaf H. Abdi, 9801 Alwaes Dr., #201, Fairfax, VA (US) 22031

( * ) Notice: Subject to any disclaimer, the term of this patent is extended or adjusted under 35 U.S.C. 154(b) by 0 days.

(21) Appl. No.: 10/158,824

(22) Filed: Jun. 3, 2002

(65) Prior Publication Data

US 2003/0015583 A1 Jan. 23, 2003

Related U.S. Application Data

(60) Provisional application No. 60/306,871, filed on Jul. 23, 2001.

(51) Int. Cl.[7] .............................................. G06F 17/60
(52) U.S. Cl. ...................... 235/379; 235/380; 235/382; 705/16; 705/14; 705/10
(58) Field of Search ................................. 235/379, 380, 235/382; 705/16, 14, 10

(56) References Cited

U.S. PATENT DOCUMENTS

| 5,386,103 | A | | 1/1995 | DeBan et al. ............... 235/379 |
|---|---|---|---|---|
| 6,038,332 | A | * | 3/2000 | Fishbine et al. ............ 382/115 |
| 6,038,553 | A | | 3/2000 | Hyde, Jr. ..................... 705/45 |
| D430,379 | S | | 8/2000 | Massey ........................ D99/28 |
| 6,105,011 | A | | 8/2000 | Morrison, Jr. ............... 705/45 |
| 6,129,273 | A | | 10/2000 | Shah .......................... 235/380 |
| 6,145,738 | A | | 11/2000 | Stinson et al. .............. 235/379 |
| 6,149,056 | A | | 11/2000 | Stinson et al. .............. 235/379 |
| 6,269,348 | B1 | * | 7/2001 | Pare et al. .................... 705/39 |
| 6,328,206 | B1 | * | 12/2001 | Schanz et al. .............. 235/379 |
| 6,450,403 | B1 | * | 9/2002 | Martens et al. ............. 235/379 |
| 2002/0019938 | A1 | * | 2/2002 | Aarons ........................ 71/168 |
| 2002/0113122 | A1 | * | 8/2002 | Brikho ........................ 235/379 |
| 2002/0154795 | A1 | * | 10/2002 | Lee et al. ................... 382/125 |

* cited by examiner

Primary Examiner—Michael G. Lee
Assistant Examiner—Allyson Sanders
(74) Attorney, Agent, or Firm—Richard C. Litman

(57) ABSTRACT

A self service check cashing apparatus, for use by a customer with a check to be cashed. The apparatus utilizes biometric technology for security against fraudulent check cashing. A method for utilizing the self service check cashing apparatus is also provided. Thumb prints and photos are used as part of the authentication process. The apparatus is also directly connected to a check verification network to insure accurate transactions. Optical character recognition (OCR) and magnetic ink character recognition (MICR) can be utilized as check reading technology by the apparatus.

8 Claims, 3 Drawing Sheets

SELF SERVICE CHECK CASHING SYSTEM AND METHOD

CROSS-REFERENCE TO RELATED APPLICATION

This application claims the benefit of U.S. Provisional Patent Application Ser. No. 60/306,871, filed Jul. 23, 2001.

BACKGROUND OF THE INVENTION

1. Field of the Invention

The present invention relates to a self service check cashing apparatus and method. More particularly, the invention is a self service check cashing apparatus and method that utilize biometric technology for secure check cashing transactions.

2. Description of Related Art

Banking systems are becoming more and more user friendly to accommodate banking customers. Automatic teller machines, or ATMs, have led the way in providing convenience to customers. Banking systems are not limited to ATMs and can take various other forms, such as a check cashing machine. A check cashing machine can save time and money, and can take the place of a bank teller having to process a customer's check.

U.S. Pat. No. Des. 430,379, issued to Massey, shows an ornamental design of a check cashing machine.

U.S. Pat. No. 5,386,103, issued to DeBan et al., describes an automated identification and verification system that utilizes universal face memory (UFM). The invention relates generally to automated banking systems and more specifically relates to a system of cashing documents such as checks, which in one case utilizes a customer operated ATM. The invention also relates to equipment at a teller's station, where a human teller also participates in the identification and verification of a customer.

U.S. Pat. No. 6,038,553, issued to Hyde, Jr., discloses an automated self-service method of, and system for, cashing checks, typically without human intervention. The system includes a check cashing database that contains customer records for registered customers. A plurality of administrative modules are provided with which individuals may register themselves and their checks and communicate with customer service representatives. A check cashing server communicates with check cashing transaction modules. The check cashing server receives check cashing requests from the check cashing transaction modules. The check cashing server processes check requests by comparing information in the request with criteria derived from the check cashing database.

U.S. Pat. No. 6,105,011, issued to Morrison, Jr., teaches a system and method by which customers may be readily identified prior to check cashing. Each customer is issued an individualized customer identification card having at least a personalized multi digit customer identification number. The customer identification card can also be encoded with additional personal data identifying the customer.

U.S. Pat. No. 6,129,273, issued to Shah, shows a method and system for automated check cashing in which an approved payee is allowed to cash a bank check payable to the payee by a previously identified maker. The method and system is usable for check cashing systems that are not associated with a particular bank and are of the type in which a computer records specific information about the payee and about checks to be cashed by the payee prior to allowing the payee to use the system.

U.S. Pat. Nos. 6,145,738 and 6,149,056, issued to Stinson et al., describe an automated check cashing unit which includes an input device to generate input signals in response to inputs from a customer, a storage device which includes a database of customer information, a check reader to receive and read a check to be processed, a cash dispenser and an electronic processor. The processor may be further configured to confirm the identification of the customer based on biometric information such as a customer's fingerprint or an image of the customer's face.

The Stinson patents are the only patents of which Applicant is aware that utilize biometric information and technology in an automated check cashing apparatus. However, this technology is not useful if the biometric data in a database is different than that provided at the time of transaction. What is needed is an automated check cashing system and method that makes better use of biometric data.

None of the above inventions and patents, taken either singly or in combination, is seen to describe the instant invention as claimed.

SUMMARY OF THE INVENTION

The invention is a self service check cashing apparatus, for use by a customer wishing to cash a check. The apparatus utilizes biometric technology for security against fraudulent check cashing. A method for utilizing the self service check cashing apparatus is also provided. Thumb prints and photos are used as part of the authentication process. The apparatus is also directly connected to a check verification network to insure accurate transactions. Optical character recognition (OCR) and magnetic ink character recognition (MICR) can be utilized as check reading technology by the apparatus.

Accordingly, it is a principal object of the invention to provide protection and security against check fraud.

It is another object of the invention to increase the efficiency of an entity that provides a check cashing apparatus to its customers.

It is a further object of the invention to provide greater convenience and access to customers who want to cash checks.

Still another object of the invention is to provide a simple cash checking alternative for people who do not have a checking account.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
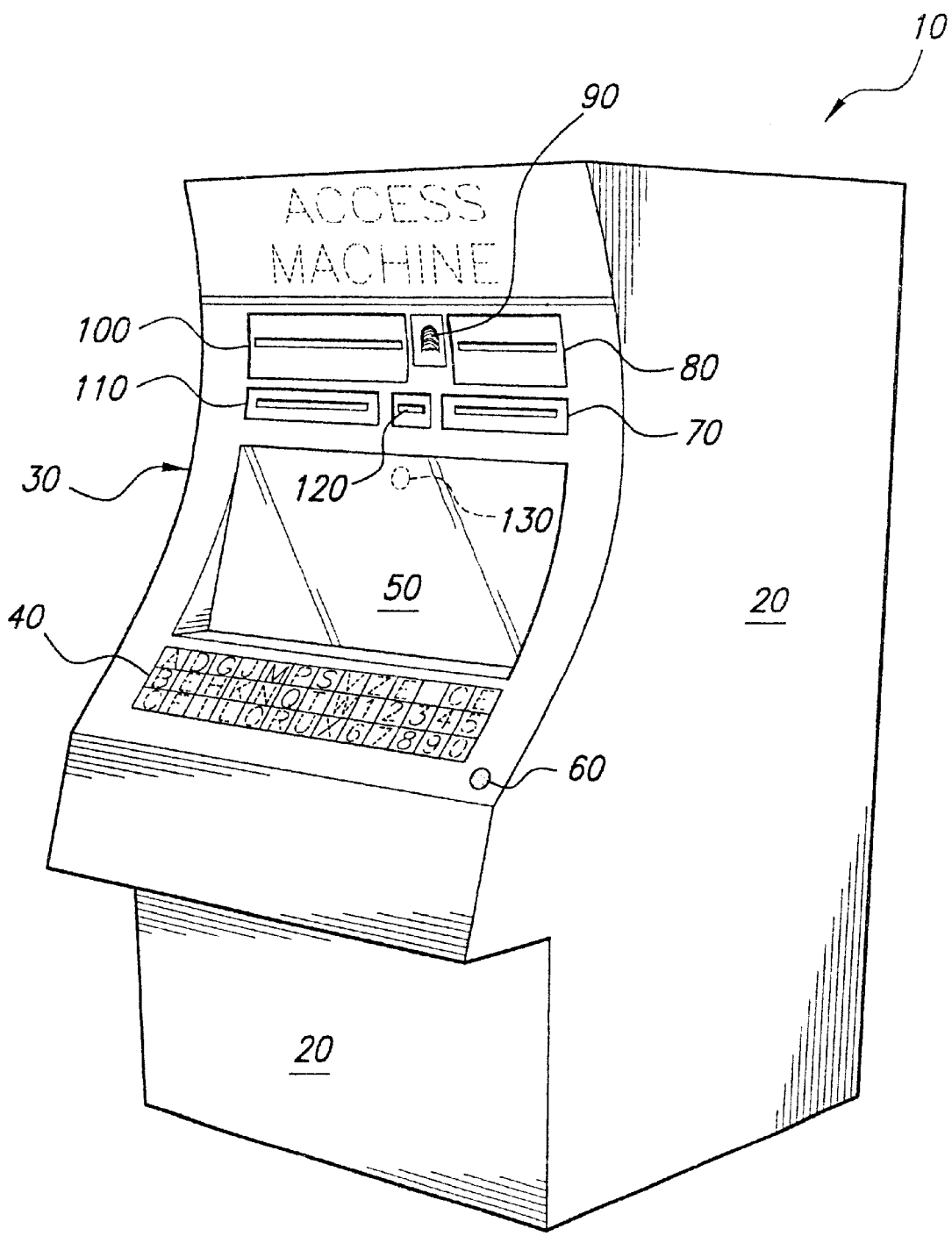
FIG. 1 is an environmental, perspective view of a self service check cashing apparatus according to the present invention.

The present invention is a self service check cashing apparatus 10 and method. More particularly, the invention is a self service check cashing apparatus 10 and method that utilize biometric technology for secure check cashing transactions. The self service check cashing apparatus 10 is depicted in FIG. 1.

The self service check cashing apparatus 10 comprises a housing 20 having a customer interface area 30 where all of the self service check cashing apparatus 10 components accessible by the customer are located. These components include an alphanumeric keyboard 40 for entering information and codes for transactions, an information displaying screen 50 for displaying information in the customer interface area 30, and a thumb printing ink reservoir 60, provided near the alphanumeric keyboard 40, for use by the customers for providing a thumbprint on the front of a check being cashed.

Several other key components are situated above the information displaying screen 50. These include a check insertion slot 70, for receiving an endorsed check to be cashed, an identification information slot 80, for receiving a customer's photo identification card, and a thumbprint scanner 90, to obtain an actual thumbprint of the customer to be compared with the thumbprint acquired from the check.

A cash withdrawal slot 100 is also provided above the information displaying area 50 and is adjacent to a receipt withdrawal slot 110 and a coin change withdrawal slot 120, where any withdrawn funds would be distributed to a customer. There is also a camera 130 placed behind the information display area 50 that will take a picture of each customer that uses the self service check cashing apparatus 10. This picture will be compared to the picture provided on the customer's identification, as discussed later in greater detail.

Figure 2:
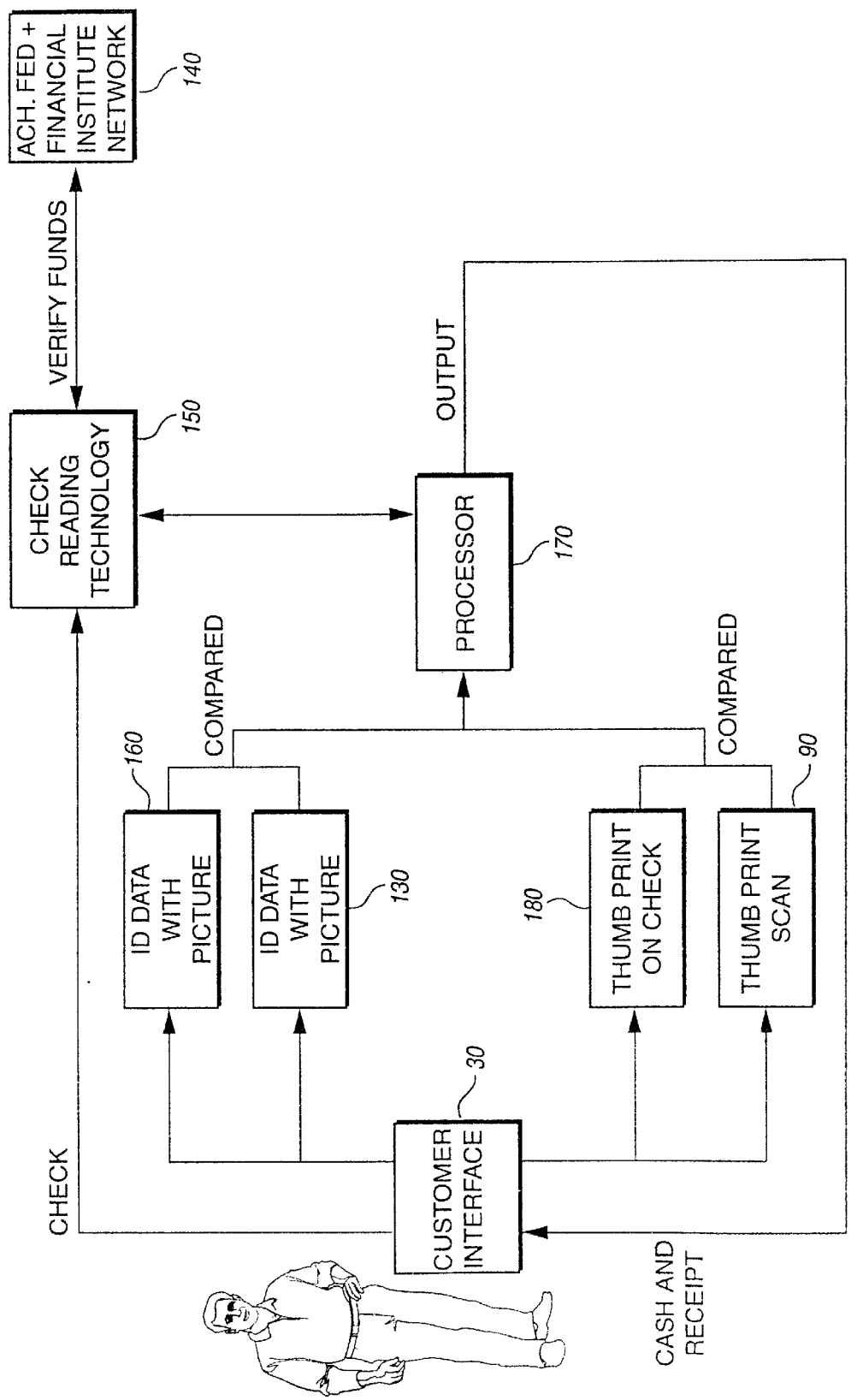
FIG. 2 is a block diagram of an overall check cashing method utilizing a check cashing apparatus according to the present invention.

FIG. 2 outlines the processing done by the self service check cashing apparatus 10. The self service check cashing apparatus 10 guides the customer through usage of the apparatus with self explanatory instructions on the information display 50. The self service check cashing apparatus 10 is electronically linked to an automated clearing house (ACH), Federal Reserve and financial institution check verification network 140, which is well-known to those skilled in the related art, and is necessary in order to verify the correct account numbers and available funds in the checking account of the check presented. It can be used by customers who want to cash a payroll check, a certified check, a tax refund check, an insurance draft or a personal check 24 hours a day, 7 days a week. In addition, a personal check can be cashed by a customer who is an account holder with a bank that utilizes a self service check cashing apparatus 10 by inserting the customer's ATM card with the customer's photo verification card.

The unique feature and benefit of the self service check cashing apparatus 10 is the fast check cashing capability that saves time and energy for a financial institution. The self service check cashing apparatus 10 will be conveniently available in banks, grocery stores, shopping malls and convenience stores. The self service check cashing apparatus 10 is commercially profitable for the commercial institutions that utilize it, because it simplifies the way these commercial institutions conduct check cashing transactions. Commercial personnel can be used for work other than check cashing and customers will not have to wait as long in line at a counter to get their check cashed.

Referring to FIG. 2, in order for the check to be utilized by the check verification network 140, it must be read by a scanner or check reader using check reading technology 150 that is well-known to those schooled in the related art. There are two check reading technology means 150 that can be used by the self service check cashing apparatus 10 to read checks; optical character recognition (OCR) or magnetic ink character recognition (MICR). The components of each technology are well-known to those schooled in the related art and can be easily incorporated into the self service check cashing apparatus 10.

Before the check is actually read and verified, the customer himself must be authenticated by the self service check cashing apparatus 10. This is done through the use and comparison of biometric information acquired by the self service check cashing apparatus 10.

The self service check cashing apparatus 10 scans a customer's picture identification 160 provided by the customer. The photograph from the picture identification 160 is then compared to a photo taken by a camera 130 hidden behind the information display unit 50. If the picture identification photo matches the picture taken by the camera 130, the processing means 170 will allow the customer to continue his authentication. If there is no match, the customer's session will be terminated and his picture identification 160 and his check will be returned to him.

The second part of the customer's authentication involves the use of "thumbprint" biometric technology. The customer will first take the front of the check, and use the thumb printing ink 60 provided on the bottom of the frontal customer interface area to make a thumbprint of his right thumb on a designed area on the front of the check 180. The check is then inserted into the self service check cashing apparatus 10. The customer can then take his right thumb and place it in front of the thumbprint scanner 90 to be scanned. In a manner similar to the customer's picture identification 160 and the camera photo 130, the processing means 170 will also compare the thumbprint made on the front of the check 180 and the image taken by the thumbprint scanner 90. This procedure ensures that an accurate thumbprint image of the person presenting the check at the self service check cashing apparatus 10 has been recorded on the check, thereby deterring the presentation of stolen, forged, or otherwise unauthorized negotiation of checks.

Note that the processing means 170 for performing a comparison between the actual visual image of the customer's thumb and the thumbprint of the customer on the check being cashed and a comparison between the customer's photo identification card photo and the camera's photo of the customer is a powerful microprocessor incorporated into the self service check cashing apparatus 10.

Once authenticated, the self service check cashing apparatus 10 will then verify the check utilizing the check verification network 140. An alphanumeric keyboard 40 is provided on the customer interface area 30 that allows a customer to cancel a transaction or perform another transaction using menu prompts and "yes" and "no" commands. A four digit personal identification number (PIN) may be provided to the customer from the commercial institution for added security.

Figure 3:
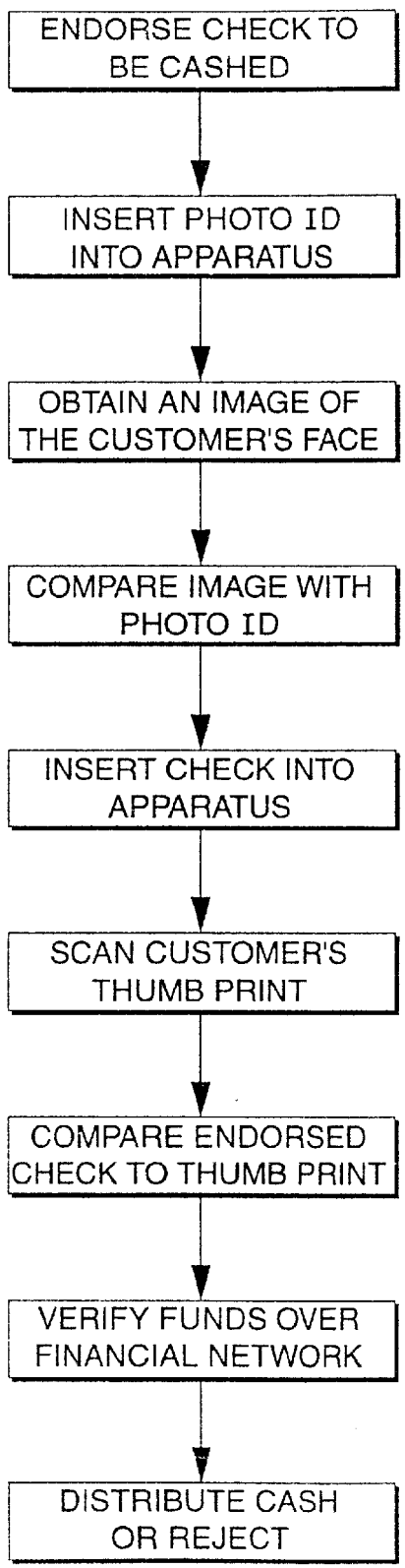
FIG. 3 is a diagram showing the steps in a check cashing method according to the present invention.

An overall method for using the self service check cashing apparatus 10 is shown in FIG. 3 and involves the steps of endorsing a check to be cashed with a thumbprint of the customer 180, inserting a photo identification card 160 into the apparatus 10, obtaining an image of the customer's face, comparing the image with the photo from the photo identification card 160, inserting the check into the apparatus 10, scanning the customer's thumb and comparing the thumbprint from the check with the scanning of the thumb, verifying the funds involved with the check over the check verification network 140 and distributing the cash and a receipt or rejecting the transaction.

Operation of the self service check cashing apparatus 10 is uncomplicated. A customer must have a photo identification card 160 and a check to be cashed and must carefully follow the steps of the overall method.

It is to be understood that the present invention is not limited to the sole embodiment described above, but encompasses any and all embodiments within the scope of the following claims.

We claim:

1. A self self service check cashing apparatus, comprising:

a housing;

a customer interface area disposed in said housing;

a plurality of customer accessible components disposed in said customer interface area, including:
- an alphanumeric keyboard for entering information for check cashing transactions;
- an information display screen;
- a thumb printing ink reservoir, whereby a customer cashing a check may imprint his thumbprint on the check;
- a check insertion slot, for receiving the check to be cashed into the apparatus,
- an identification information slot, for receiving the customer's photo identification card photo in the apparatus;
- a thumbprint scanner, to obtain an actual visual image of the customer's thumbprint;
- a cash withdrawal slot and a coin change withdrawal slot for distributing cash money and monetary coins to the customer; and
- a receipt withdrawal slot to distribute a transaction receipt to the customer;
- a camera placed behind the information display area that is for taking a photo of the customer using the apparatus;
- a processing means for performing a comparison between the actual visual image of the customer's thumb and the thumbprint of the customer on the check being cashed and a comparison between the customer's photo identification card photo and the camera's photo of the customer; and
- a check reading means for reading information on the check.

2. The apparatus according to claim 1, wherein the processing means is a microprocessor.

3. The apparatus according to claim 1, wherein the customer's right thumbprint is provided on the check and is compared with the actual visual image of the customer's thumbprint.

4. The apparatus according to claim 1, wherein the check reading means is optical character recognition.

5. The apparatus according to claim 1, wherein the check reading means is magnetic ink character recognition.

6. The apparatus according to claim 1, wherein the check reading means is connected to a check verification network, an automated check clearing house and the Federal Reserve.

7. The system according to claim 1, wherein a customer's personal check can be cashed by the system with a customer's ATM card and a customer's photo-identification card.

8. A method for using a self service check cashing apparatus, for use by a customer with a check to be cashed, comprising the steps of:

endorsing the check to be cashed with a thumbprint;

inserting a photo identification card into the apparatus;

obtaining an image of the customer's face;

comparing the image of the customer's face with a photo from the photo identification card;

inserting the check into the apparatus;

scanning the customer's thumb and comparing the thumbprint from the endorsement with the scanning of the thumb;

verifying the funds involved with the check over a check verification network; and distributing cash and a receipt when the check is valid.

* * * * *